(12) United States Patent
Hasegawa

(10) Patent No.: US 8,430,554 B2
(45) Date of Patent: Apr. 30, 2013

(54) SUPPORT UNIT, LIGHTING DEVICE, AND DISPLAY DEVICE

(75) Inventor: Yohichi Hasegawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 151 days.

(21) Appl. No.: 13/122,583

(22) PCT Filed: Jul. 30, 2009

(86) PCT No.: PCT/JP2009/063549
§ 371 (c)(1),
(2), (4) Date: Apr. 5, 2011

(87) PCT Pub. No.: WO2010/052957
PCT Pub. Date: May 14, 2010

(65) Prior Publication Data
US 2011/0199754 A1    Aug. 18, 2011

(30) Foreign Application Priority Data
Nov. 5, 2008 (JP) .................................. 2008-284063

(51) Int. Cl.
*G02F 1/13357* (2006.01)
(52) U.S. Cl.
USPC ........... 362/634; 382/632; 382/97.2; 382/225
(58) Field of Classification Search .......... 362/632–634, 362/225, 97.2; 349/58, 67
See application file for complete search history.

(56) References Cited

U.S. PATENT DOCUMENTS

| | | | |
|---|---|---|---|
| 7,134,776 B2* | 11/2006 | Kanatsu | 362/561 |
| 7,204,604 B2* | 4/2007 | Chou | 362/227 |
| 7,270,467 B2* | 9/2007 | Kim | 362/634 |
| 7,600,889 B2* | 10/2009 | Fukuda | 362/225 |
| 7,651,258 B2* | 1/2010 | Kim | 362/634 |
| 7,993,028 B2* | 8/2011 | Wu | 362/269 |
| 8,077,271 B2* | 12/2011 | Yang | 349/61 |
| 8,215,719 B2* | 7/2012 | Kelly et al. | 299/81.1 |
| 8,228,457 B2* | 7/2012 | Sato et al. | 349/58 |
| 2007/0109767 A1 | 5/2007 | Han et al. | |

FOREIGN PATENT DOCUMENTS

| | | |
|---|---|---|
| JP | 2004-106080 A | 7/2004 |
| JP | 2007-128887 A | 5/2007 |
| RU | 2 185 004 C2 | 7/2002 |
| RU | 2 237 832 C2 | 10/2004 |
| RU | 2 265 768 C1 | 12/2005 |
| SU | 383332 A | 8/1973 |

OTHER PUBLICATIONS

English translation of Official ommunication issued in corresponding Russian Patent Application No. 2011117929, mailed on Jul. 19, 2012.
Official Communication issued in International Patent Application No. PCT/JP2009/063549, mailed on Sep. 8, 2009.

* cited by examiner

*Primary Examiner* — Anabel Ton
(74) *Attorney, Agent, or Firm* — Keating & Bennett, LLP (57) ABSTRACT

A lamp clip (LC) includes a support pin (SP) making contact with and supporting an optical sheet such as a diffusion plate (46), and also includes ribs (RB) rising from the outer periphery of the support pin (SP) and reinforcing the support pin (SP).

15 Claims, 6 Drawing Sheets

SUPPORT UNIT, LIGHTING DEVICE, AND DISPLAY DEVICE

TECHNICAL FIELD

The present invention relates to a support unit that supports an optical sheet, further a lighting device that includes the support unit and a display device such as a liquid crystal display device that incorporates the lighting device.

BACKGROUND ART

Figure 5:
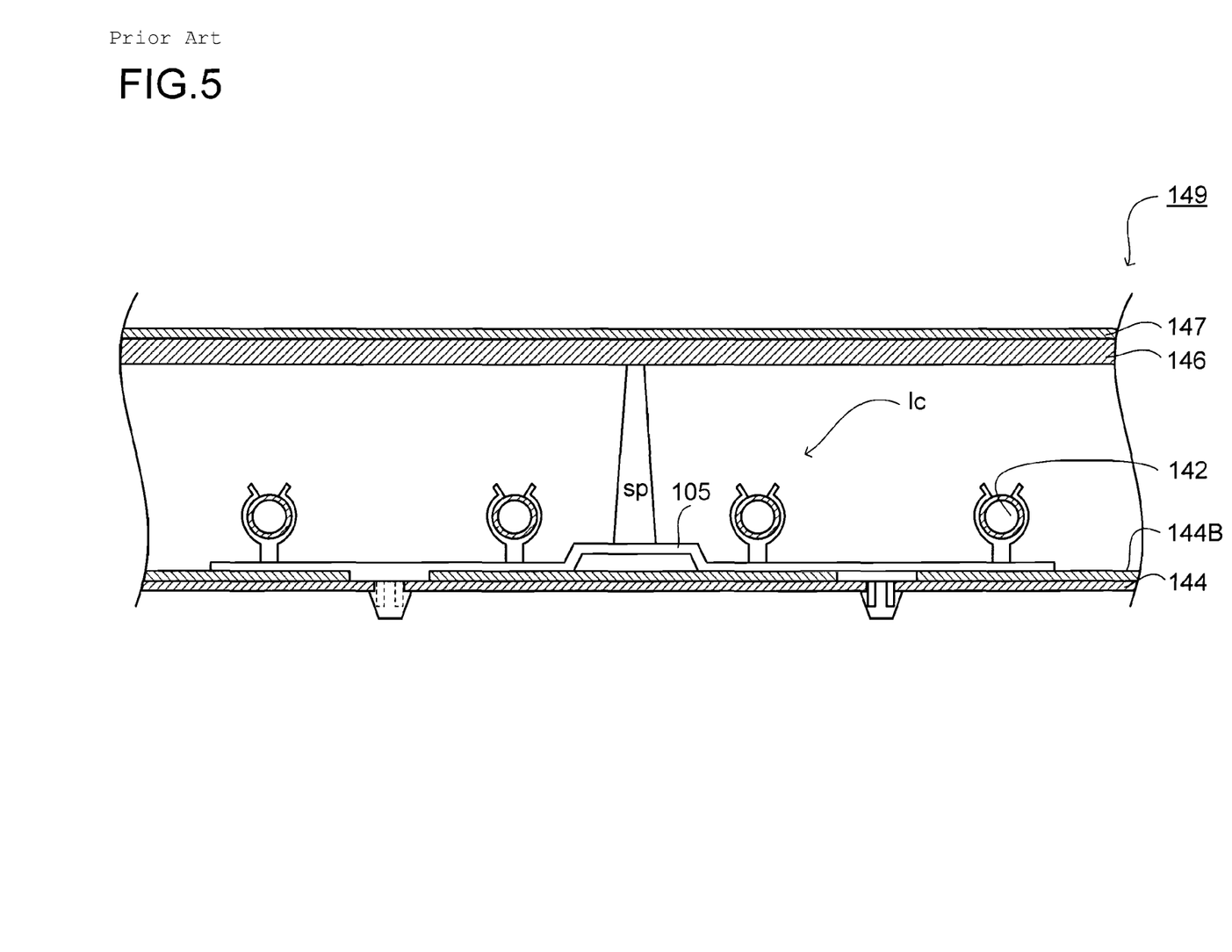
FIG. 5 is a sectional view of a backlight unit that is included in a conventional liquid crystal display device.

Conventionally, in a backlight unit of a liquid crystal display device, a diffusion plate (optical sheet) that diffuses light from a light source is incorporated, further a lens sheet (optical sheet) that enhances a light collection characteristic is disposed on the diffusion plate. And, as shown in FIG. 5, these diffusion plate 146 and lens sheet 147 are supported by a support pin sp of a lamp clip lc that is disposed on a bottom surface 144B of a backlight chassis 144 (see a patent document 1).

In the mean time, in such a backlight unit 149, deformation of the resin-made diffusion plate 146 and the like that occurs because of heat from a fluorescent lamp 142, especially, the deformation of the diffusion plate 146 and the like, which occurs because of heat or radiated heat that travel in accordance with turning-on/-off of the fluorescent lamp 142, becomes a problem. This is because in a case where such deformation (bending) occurs, large force is applied to the support pin sp of the lamp clip (support unit) lc by the bending diffusion plate 146 and the like.

However, in the backlight unit 149 in the patent document 1, the light clip lc includes a buffer portion 105. And, the buffer portion 105 buffers the force that acts on the support pin sp which is pushed by the bending of the diffusion plate 146 and the like. Accordingly, the support pin sp and the diffusion plate 146 do not come into relatively tight contact with each other.

CITATION LIST

Patent Literature

PLT1: JP-A-2007-128887

SUMMARY OF INVENTION

Technical Problem

However, the way of deformation of the diffusion plate 146 is not uniform. Accordingly, force acts on the support portion sp of the lamp clip lc from various directions. In this case, as described in the patent document 1, in a case of an arch-shape buffer portion 105, the force that acts on along an extension direction of the support pin sp is well buffered; however, it is difficult to say that the force from the other directions is well buffered (see a left view and an intermediate view in FIG. 6, especially, see white arrows in the intermediate view; here, FIG. 6 chiefly shows the support pin sp).

Figure 6:
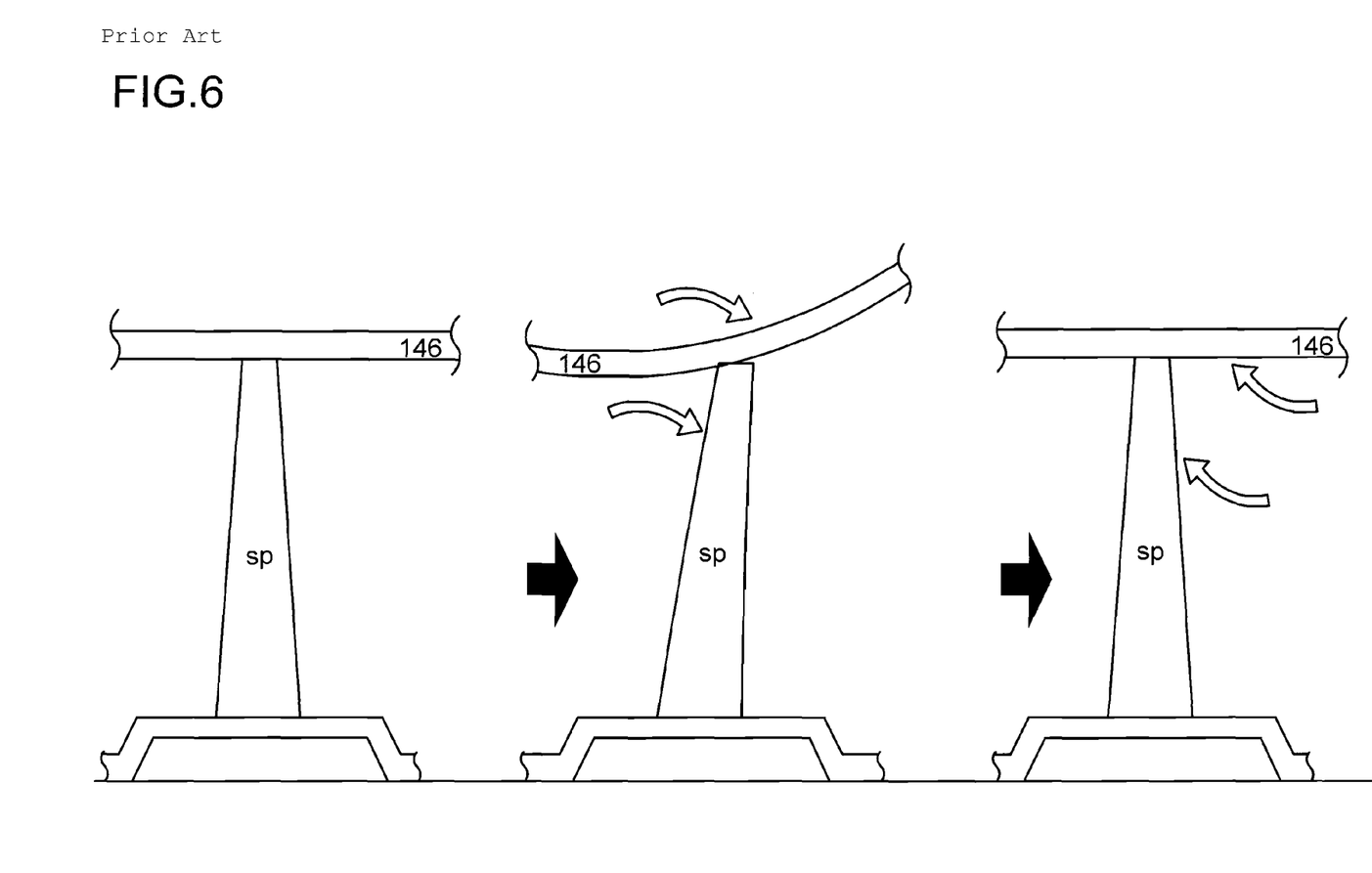
FIG. 6 is a side view showing: a state of a diffusion plate; and a state of a support pin that supports the diffusion plate.

Besides, if the fluorescent lamp 142 continues to operate, because of this, the internal temperature of the backlight unit 149 increases and the diffusion plate 146 keeps sagging down to bend, the bent support pin sp comes not to endure pressure of the diffusion plate 146 and bounces; and, as shown in the right view of FIG. 6, tries to return the diffusion plate 146 to the original state (see white arrows in the right view of FIG. 6). And, caused by the deformation of the support pin sp that tries to return the original state, an unusual sound occurs from the support pin sp.

The present invention has been made in light of the above conditions. And, it is an object of the present invention is to provide a support unit that includes a support pin that is not bent by force which is caused by an optical sheet that bends in various directions.

Solution to Problem

The support unit supports an optical sheet that refracts received light and makes the refracted light travel and go out. In detail, the support unit includes: a support pin that comes into contact with the optical sheet to support the optical sheet; and a rib that swells from an outer circumference of the support pin and reinforces the support pin.

According to this, even if the optical sheet bends and pressure acts on the support pin, the support pin is not bent by the pressure. Because of this, an unusual sound caused by deformation of the support pin, especially, by recovery deformation of the support pin that bends and thereafter tries to return to the original shape is curbed.

Besides, it is desirable that the rib is radially positioned with respect to the support pin.

According to this, even if pressure acts on the support pin from any direction because of the bending of the optical sheet, the support pin does not bend. Because of this, an unusual sound caused by the deformation of the support pin is surely curbed.

Besides, it is desirable that the rib has a shape which becomes thinner toward a tip of the support pin. According to this, the volume of the rib in the vicinity of the tip of the support pin becomes small. Because of this, the rib does not come into sight of the optical sheet and is invisible from outside.

Besides, it is desirable that the tip of the support pin becomes thinner toward a tip end thereof. According to this, like the tip of the rib, the tip of the support pin does not come into sight of the optical sheet and is invisible from outside.

Here, it is possible to say that a lighting device, which includes: the support unit; an optical sheet supported by the support unit; and a light source that supplies light to the optical sheet, also is the present invention. Besides, it is possible to say that a display device, which includes: the lighting device; and a display panel that receives light from the lighting device, also is the present invention.

Advantageous Effects of Invention

In the support unit according to the present invention, the rib reinforces the support pin, so that the strength of the support pin increases. Because of this, even if the optical sheet supported by the support pin bends, the support pin is not caused by this to bend. As a result of this, an unusual sound caused by the deformation of the support pin is curbed.

DESCRIPTION OF EMBODIMENTS

Embodiment 1

An embodiment is described based on drawings as follows. Here, for convenience, there is a case where member references and the like are omitted; however, in such a case, other drawings are referred to.

Figure 4:
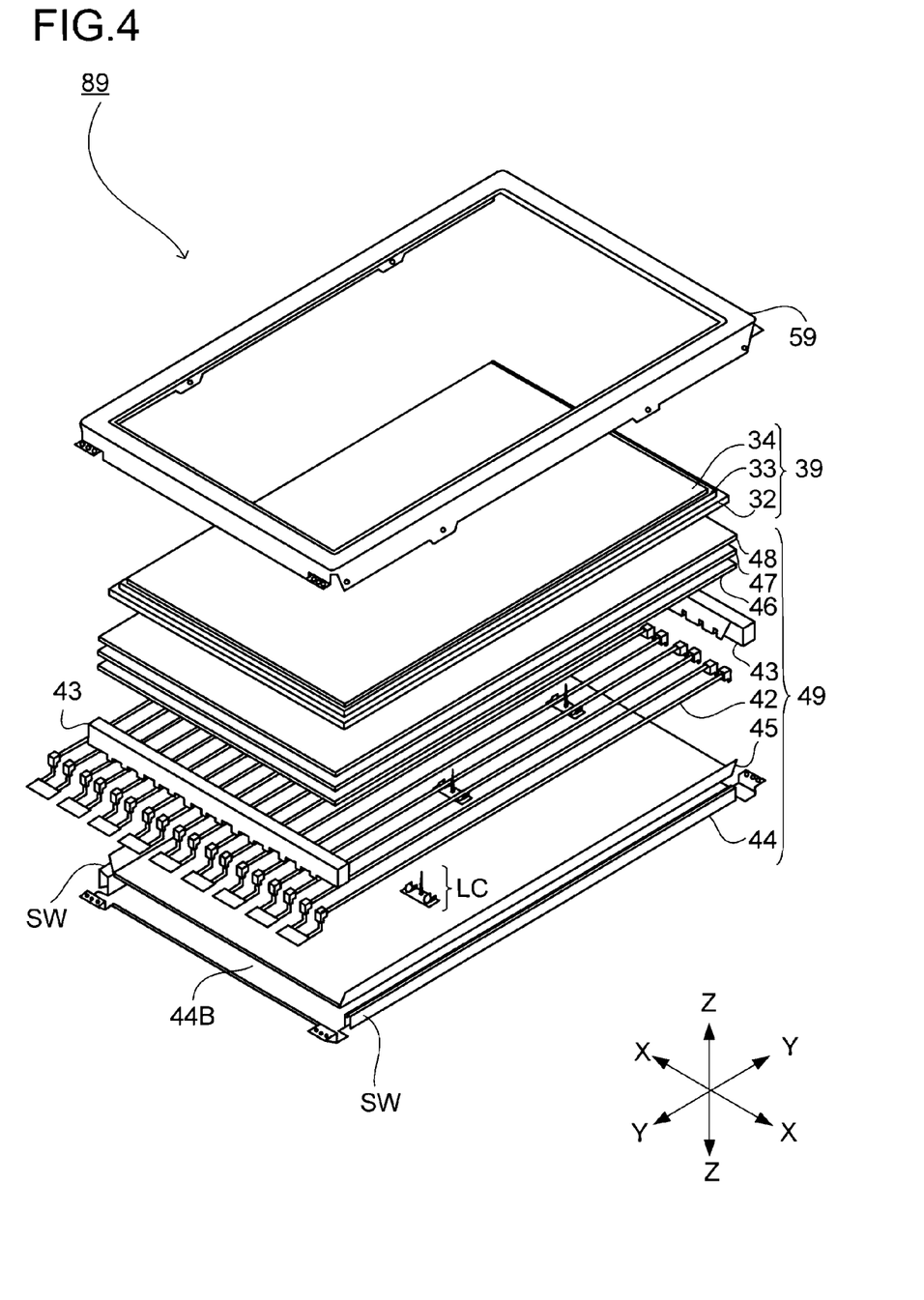
FIG. 4 is an exploded perspective view of a liquid crystal display device.

FIG. 4 is an exploded perspective view of a liquid crystal display device 89 that is an example of a display device. As shown in this figure, the liquid crystal display device 89 includes: a liquid crystal display panel 39; a backlight unit (lighting device) 49; and a bezel 59.

The liquid crystal display panel 39 attaches an active matrix board 32 that includes switching elements such as a TFT (Thin Film Transistor) and the like, and an opposite board 33 that is opposite to the active matrix board 32 to each other by means of a seal material (not shown). And, liquid crystal (not shown) is injected into a gap between both boards 32, 33 (here, polarization films are so disposed as to sandwich the active matrix board 32 and the opposite board 33).

The liquid crystal display panel 39 is a non-light-emitting display panel, so that the liquid crystal display panel 39 receives light (backlight) from the backlight unit 49 to perform a display function. Because of this, if the light from the backlight unit 49 is able to evenly shine onto the entire surface of the liquid crystal display panel 39, the display quality of the liquid crystal display panel 39 improves.

The backlight unit 49, to generate backlight, includes: a fluorescent lamp (light source, linear light source) 42; a lamp holder 43; a lamp clip (support unit) LC; a backlight chassis 44; a reflection sheet (optical sheet) 45; a diffusion plate (optical sheet) 46; and lens sheets (optical sheet) 47, 48.

The fluorescent lamp 42 is a light source that is linear (bar shape, cylindrical shape or the like) and a plurality of the lamps are disposed in the backlight unit 49 (however, for convenience, only part of the lamps are shown in the figurer).

However, the kind of the fluorescent lamp 42 is not limited; for example, a cold-cathode tube and a hot-cathode tube may be used. Besides, hereinafter, a parallel direction of the fluorescent lamp 42 is called an X direction; an extension direction of the fluorescent lamp 42 is called a Y direction; and a direction perpendicular to both of the X direction and the Y direction is called a Z direction.

The lamp holder 43 is a block-shape member that includes a pair of holders, and holds: the fluorescent lamp 42; the diffusion plate 46; and the lens sheets 47, 48. In detail, each lamp holder 43 supports one end and the other end of the fluorescent lamp 42, thereby disposing the fluorescent lamp 42 in the backlight unit 49. Besides, a surface of the lamp holder 43 that faces the liquid crystal display panel 39 supports the diffusion plate 46 and the lens sheets 47, 48 are disposed on the diffusion plate 46, so that the diffusion plate 46 and the lens sheets 47, 48 are disposed in the backlight unit 49.

The lamp clip LC includes: a clip piece CP that holds the fluorescent lamp 42; and a support pin SP that supports the optical sheets such as the diffusion sheet 46 and the like (details are described later).

The backlight chassis 44 is a housing body that includes: a bottom surface 44B; and walls (opposite walls) SW, SW that rise upright from the bottom surface 44B and are opposite to each other; and houses various members such as the fluorescent lamp 42 and the like.

The reflection sheet 45 is a reflection member that covers the bottom surface 44B of the backlight chassis 44. And, the reflection sheet 45 reflects light from the fluorescent lamp 42 that is positioned in the backlight chassis 44. In detail, the reflection sheet 45 reflects part of the radial light (radial light with respect to the fluorescent lamp 42) emitted from the fluorescent lamp 42 to guide the radial light to an open surface of the backlight chassis 44.

The diffusion plate 46 is a member formed of a resin that contains polyethylene terephthalate and the like which have a function to scatter light and a function to diffuse light. And, the diffusion plate 46 is so positioned as to cover the fluorescent lamp 42 that are disposed in parallel with each other on the bottom surface 44B of the backlight chassis 44. As a result of this, when the light that travels from the fluorescent lamp 42 enters the diffusion plate 46, the light is scattered and diffused and spreads in surface directions.

The lens sheet 47 is an optical sheet that has, for example, a prism shape on a sheet surface and narrows directivity of the light, and is so positioned as to cover the diffusion plate 46. Because of this, the lens sheet 47 collects the light traveling from the diffusion plate 46 and improves the brightness.

The lens sheet 48 is an optical sheet that is so positioned as to cover the lens sheet 47, transmits a polarized-light component present in a direction and reflects a polarized-light component perpendicular to the transmitted polarized-light component. And, the lens sheet 48 reflects and reuses the polarized-light component that is absorbed by the polarization film 34, thereby improving the brightness of the liquid crystal display panel 39

The bezel 59 is a cover of the liquid crystal display device 89 and a member that collaborates with the backlight chassis 44 to sandwich the backlight unit 49 and the liquid crystal display panel 39 positioned on the backlight unit 49.

And, in the above backlight unit 49, the parallel fluorescent lamp 42 emits the light in accordance with an alternating-current signal that is supplied from an inverter (not shown). The light directly reaches the diffusion plate 46, or, reflects off the reflection sheet 45 and thereafter reaches the diffusion plate 46. Further, the light that reaches the diffusion plate 46 is diffused and passes through the lens sheets 47, 48, so that the light turns into the backlight having high brightness and goes out. And, the backlight reaches the liquid crystal display panel 39 and the liquid crystal display panel 39 displays an image.

Figure 1:
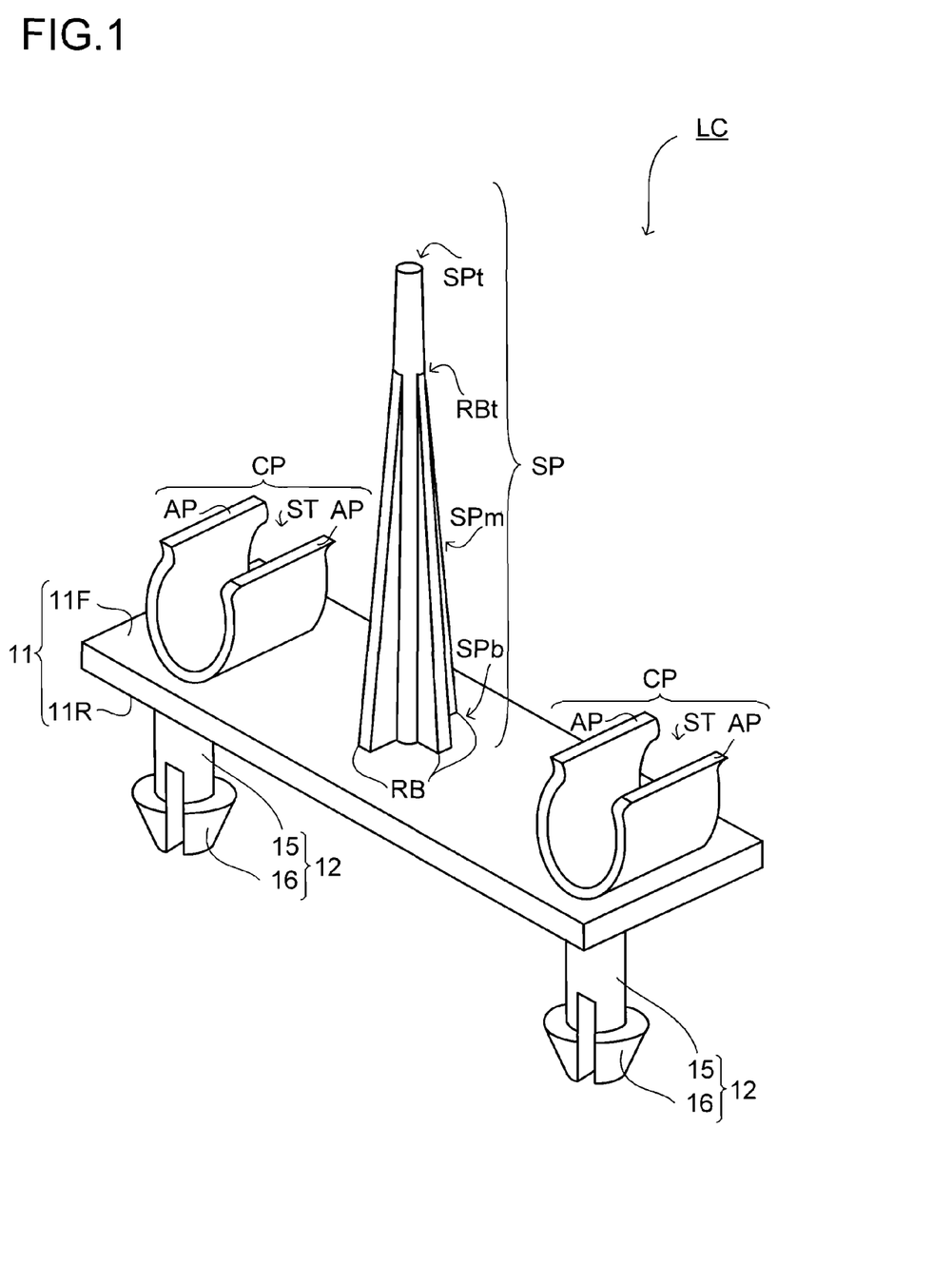
FIG. 1 is a perspective view of a lamp clip.
Figure 2:
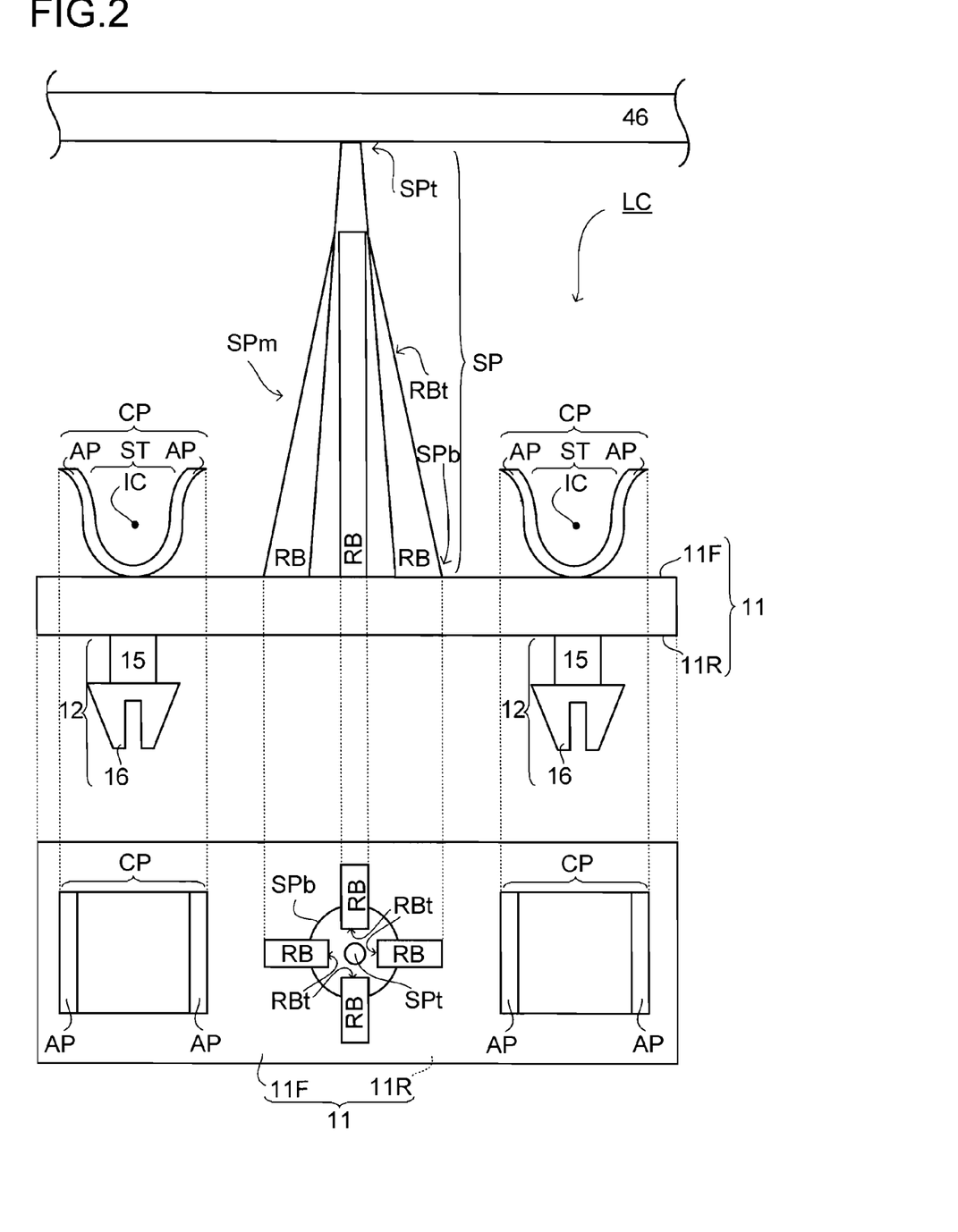
FIG. 2 is a two-directional view showing a side view and a plan view of a lamp clip.

Here, the lamp clip LC is described in detail by means of FIG. 1 and FIG. 2. FIG. 1 is a perspective view of the lamp clip LC shown in FIG. 4; FIG. 2 is a two-directional view showing a side view and a plan view of the lamp clip LC (here, in the side view, for convenience, the diffusion plate 46 also is shown). As shown in FIG. 1 and FIG. 2, the lamp clip LC includes: a base portion 11; an engagement portion 12; a clip piece CP; a support pin SP; and a rib RB.

The base portion 11 is a member that supports the clip piece CP, the support pin SP, and the rib RB on a surface 11F, while hanging the engagement portion 12 from a rear surface 11R. In other words, the base portion 11 is a member that holds: the clip piece CP; the support pin SP; the rib RB; and the engagement portion 12.

The engagement portion 12 is a member that connects with the rear surface 11R of the base portion 11 and disposes the lamp clip LC itself on the bottom surface 44B of the backlight chassis 44. Specifically, the engagement portion 12 includes a protrusion piece 15 and a hook piece 16.

The protrusion piece 15 is a pillar piece (here, the shape of the pillar may be cylindrical or polygonal) that has an outer diameter which is slightly smaller than a diameter of an opening (not shown) that is formed through the backlight chassis 44; and protrudes from the rear surface 11R of the base portion 11. And, the protrusion piece 15 fits into the opening, thereby making the lamp clip LC unmoved in a surface direction of the bottom surface 44B of the backlight chassis 44.

Here, when the protrusion piece 15 fits into the opening of the bottom surface 44B of the backlight chassis 44, the rear surface 11R of the base portion 11 comes into contact with the bottom surface 44B. Because of this, it is desirable that the rear surface 11R of the base portion 11 and the bottom surface 44B of the backlight chassis 44 come into tight contact with each other. For example, if the bottom surface 44B of the backlight chassis 44 is a flat surface, it is desirable that the rear surface 11R of the backlight chassis 44 also is a flat surface.

The hook piece 16 is a member that is formed at a tip of the protrusion piece 15 and hooks on a rim of the opening of the backlight chassis 44. Accordingly, the hook piece 16 hooks on the rim of the opening of the bottom surface 44B, thereby making the lamp clip LC unmoved in a rising direction (vertical direction and the like) with respect to the bottom surface 44B.

The clip piece CP is a member that is positioned on the surface 11F of the base portion 11 and holds a side surface of the bar-shape (cylindrical shape and the like) fluorescent lamp 42. Because of this, the clip piece CP, to hold the fluorescent lamp 42 that has a cylindrical shape or the like, is formed into a cylindrical tube shape that has an cutout ST on a side surface. Here, in order for the clip piece CP to hold the fluorescent lamp 42, an inner diameter of the clip piece CP is slightly larger than an outer diameter of the fluorescent lamp 42.

Here, the clip piece CP includes extension portions AP, AP that serve as edge portions of the cutout ST. The extension portions AP, AP become wider toward distant points from the inner-diameter center of the clip piece CP. Because of this, a gap (between the extension potions AP, AP) of the cutout ST becomes wider toward a distant point from the inner-diameter center of the clip piece CP.

And, the extension portions AP, AP have elasticity because they are formed of the resin. Accordingly, when the fluorescent lamp 42 is applied to and pushed against the cutout ST, the extension portions AP, AP move away because of the elasticity. As a result of this, the fluorescent lamp 42 easily fits into the inside of the clip piece CP.

Besides, after the fluorescent lamp 42 fits into the clip piece CP, the extension portions AP, AP with the gap of the cutout ST widened return to the original state (usual state in which the fluorescent lamp 42 is not held) caused by the elasticity. Accordingly, the extension portions AP, AP come close to each other to tightly hold the fluorescent lamp 42. As a result of this, the fluorescent lamp 42 does not come out of the clip piece CP and is stably held.

The support pin SP is conic and protrudes from the surface 11F of the base portion 11. Because of this, the support pin SP rises upright with respect to the bottom surface 44B of the backlight chassis 44, comes into contact with and supports the diffusion plate 46 that covers the bottom surface 44B. In detail, usually, as shown in the side view of FIG. 2, the support pin SP does not bend and supports the diffusion plate 46 that is held horizontally.

The rib RB is a reinforcement member that swells from an outer circumference of the support pin SP and enhances the strength of the support pin SP. In detail, the rib RB swells from the outer circumference that extends from an end potion SPb of the support pin SP to a point near a tip SPt of the support pin SP and comes into contact with the base portion 11 (here, the contact between the rib RB and the base portion 11 means not only direct contact and indirect contact but also a state in which the rib RB and the base portion 11 are unitarily connected to each other like a unitarily formed component).

Figure 3:
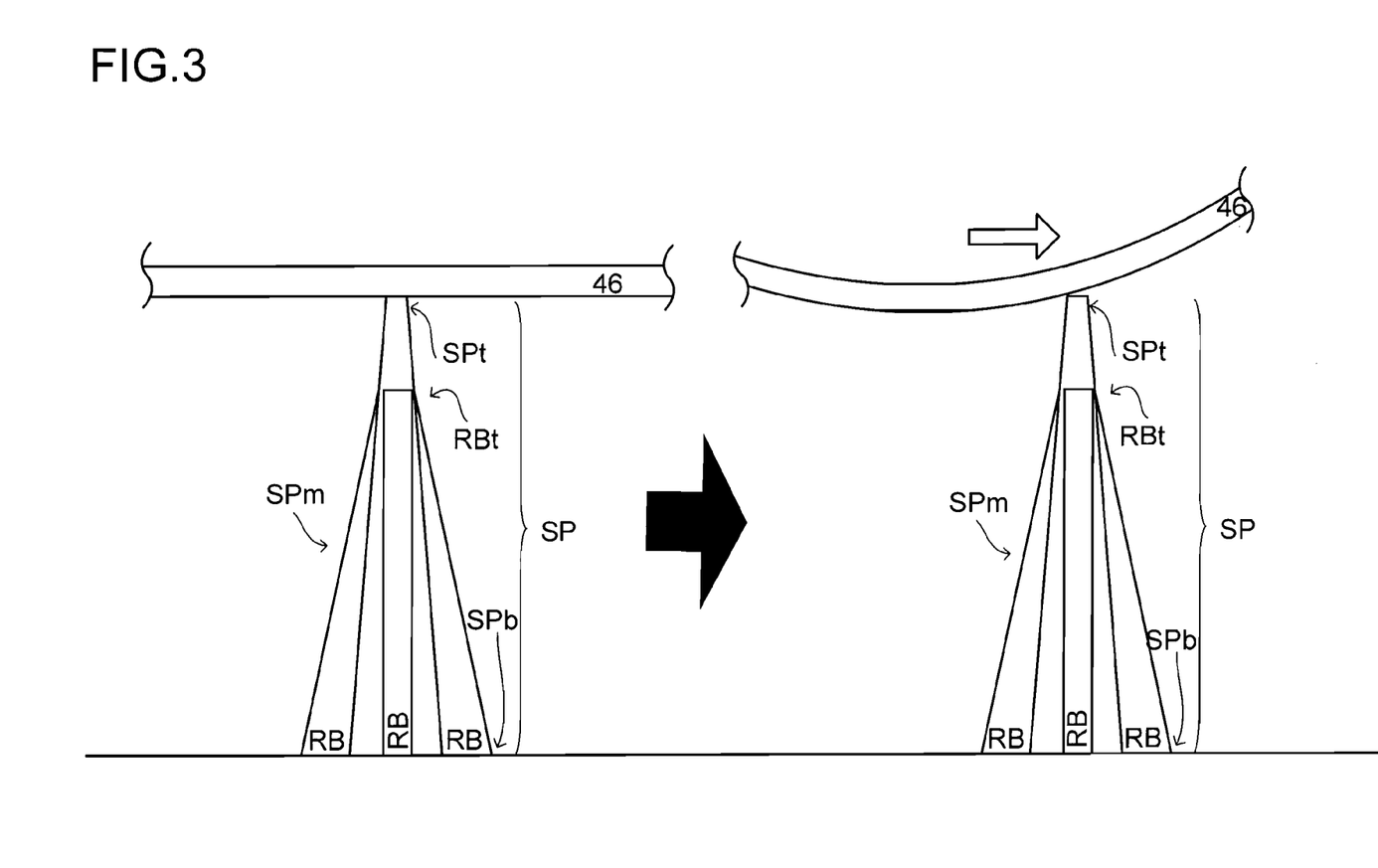
FIG. 3 is a side view showing: a process in which a diffusion plate bends; and a state of a support pin that supports the diffusion plate.

According to this, even if the diffusion plate 46 bends because of the influence of heat generated from the fluorescent lamp 42 that shines; and the support pin SP in contact with the diffusion plate 46 tries to bend, as shown in FIG. 3, the rib RB is able to support the support pin SP. Because of this, the support pin SP does not bend (a white arrow in FIG. 3 means a pressure direction due to the bending of the diffusion plate 46).

For example, at a portion (e.g., a portion near one end) other than the center of the diffusion plate 46, the diffusion plate 46 bends to try to put down the support pin SP from a side (that is, a circumference of the support pin SP) (see the right view of FIG. 3). Accordingly, the support pin SP is obliquely pushed down by the bending diffusion plate 46.

However, the support pin SP is reinforced by the rib RB, so that the support pin SP supports the diffusion plate 46 without bending. Because of this, various troubles caused by the bending of the support pin SP do not occur.

Here, as a trouble example, there is a case where the bending support pin SP tries to return to the original state after elapse of a predetermined time, and an unusual sound is caused. In detail, in a case where the fluorescent lamp 42 continues to operate, because of this, the internal temperature of the backlight unit 49 increases and the diffusion plate 46 keeps sagging down to bend, the support pin SP, if not reinforced by the rib RB, becomes unable to endure the pressure of the diffusion plate 46 and bounces, thereby trying to return the diffusion plate 46 to the original state.

And, caused by the deformation (such deformation is called recovery deformation) of the support pin SP that tries to return to the original state, an unusual sound occurs from the support pin SP, which is a trouble example.

Besides, the unusual sound due to the recovery deformation of the support pin SP that is bent is not limited to the case where the operation state of the fluorescent lamp 42 continues. For example, the fluorescent lamp 42 is turned off, the influence of the heat disappears, so that the diffusion plate 46 tries to return to the original state (flat state). Accordingly, the force that acts on the tip SPt of the support pin SP from the side also gradually decreases.

In such a case, the support pin SP that is not reinforced by the rib RB and is bent also tries to return to the original state. And, caused by the deformation of the support pin SP that tries to return to the original state, an unusual sound occurs from the support pin SP. This also is a trouble example caused by the bending of the support pin SP.

As described above, in short, if the support pin SP is reinforced by the rib RB, the support pin SP is not bent by the pressure of the diffusion plate 46. Because of this, the support pin SP is not deformed to recover, so that an unusual sound does not occur.

In the mean time, it is desirable that a plurality of such ribs RB are formed on the outer circumference of the support pin SP, and it is especially desirable that the ribs RB are radially positioned with respect to the support pin SP (e.g., as shown in the plan view of FIG. 2, it is desirable that the ribs RB are positioned crosswise).

According to this, even if the support pin SP bends and the tip SPt tries to vibrate in various directions, the rib RB is able to support the support pin SP. Because of this, the support pin SP reinforced by the rib RB is not bent by the pressure of the diffusion plate 46, so that the unusual sound caused by the recovery deformation of the support pin SP does not occur.

Here, as the shape of the rib RB, for example, as shown in the side view of FIG. 2, there is the triangular-shape rib RB when seen from a side of the support pin SP. However, the shape is not limited to this: a quadrangular shape, a polygonal shape, and a shape that includes a curved portion may be used.

However, if the rib RB is positioned close to the tip SPt of the support pin SP, the rib RB comes into sight of the diffusion plate 46 and the like and is easily visible from outside. Because of this, it is desirable that the rib RB becomes thinner toward the tip SPt of the support pin SP. In other words, to make the portion (the volume of the rib RB near the tip SPt of the support pin Sp) that easily comes into sight because the rib RB is close to the diffusion plate 46 as small as possible, it is desirable that the rib RB has a shape which becomes thinner toward the tip SPt of the support pin SP.

Besides, the rib RB, as shown in FIG. 1 and FIG. 2, is positioned on the outer circumference from the end portion SPb of the support pin SP to the point near the tip SPt of the support pin SP. However, this is not limiting. For example, the rib RB may be positioned on an outer circumference from the end portion SPb of the support pin SP to an intermediate portion SPm of the support pin SP. According to this, a tip RBt of the rib RB is surely away from the tip SPt of the support pin SP, so that the rib RB does not come into sight of the diffusion plate 46 and the like and is invisible from outside.

Here, as shown in FIG. 1 and FIG. 2, the support pin SP is conic and the tip SPt also becomes thinner. Because of this, the tip SPt of the support pin SP also does not come into sight of the diffusion plate 46 and the like and is invisible from outside.

Other Embodiments

In the mean time, the present invention is not limited to the above embodiments, and various modifications are possible without departing from the spirit of the present invention.

For example, the material of the lamp clip LC is not especially limited; however, a white resin is desirable. According to this, the light that hits the lamp clip LC is reflected, so that the lamp clip LC itself is not easily visible from outside via the diffusion plate 46.

Besides, the position of the lamp clip LC is not especially limited. In other words, the lamp clip LC may be positioned near the center of the diffusion plate 46 or may be positioned at a portion other than the position near the center. However, when the lamp clip LC is positioned at a portion (near the center and the like) corresponding to a portion of the diffusion plate 46 that is bent most easily, occurrence of an unusual sound is effectively curbed.

Besides, in the above backlight unit 49, the light source is the fluorescent lamp 42, so that the support pin SP is included in the lamp clip LC and the support pin SP supports the optical sheets such as the diffusion plate 46 and the like. However, the light source of the backlight unit 49 is not limited to the fluorescent lamp 42, and a light emitting element such as an LED (Light Emitting Diode) and the like may be used.

However, in the case of the backlight unit 49 that incorporates such an LED, the lamp clip LC (in detail, the clip piece CP) becomes unnecessary. Accordingly, in such backlight unit 49, a support unit, which has the support pin SP as a main body that is reinforced by the rib RB, is incorporated. And, the support pin SP of the support unit supports the diffusion plate 46 and the like.

Besides, in the above description, as the examples of the optical sheet, the diffusion plate 46 and the lens sheets 47, 48 are described; However, these are not limiting. In short, a sheet that transmits the light may be used.

REFERENCE SIGNS LIST

[LC] lamp clip (support unit)
[11] base portion
[12] engagement portion
[15] protrusion piece
[16] hook piece
[CP] clip piece
[SP] support pin
[SPt] tip of support pin
[SPm] intermediate portion of support pin
[SPb] end portion of support pin
[RB] rib
[RBt] rib tip
[39] liquid crystal display panel
[42] fluorescent lamp
[43] lamp holder
[44] backlight chassis
[44B] bottom surface of backlight chassis
[45] reflection sheet (optical sheet)
[46] diffusion sheet (optical sheet)
[47] lens sheet (optical sheet)
[48] lens sheet (optical sheet)
[49] backlight unit
[89] liquid crystal display device

The invention claimed is:

1. A support unit that supports an optical sheet which refracts received light and makes the refracted light travel and go out, the support unit comprises:
    a support pin that comes into contact with the optical sheet to support the optical sheet; and
    a rib that swells from an outer circumference of the support pin and reinforces the support pin.

2. The support unit according to claim 1, wherein the rib is radially positioned with respect to the support pin.

3. The support unit according to claim 1, wherein the rib has a shape which becomes thinner toward a tip end of the support pin.

4. The support unit according to claim 1, wherein a tip of the support pin becomes thinner toward a tip end thereof.

5. A lighting device comprising:
    the support unit according to claim 1;
    the optical sheet supported by the support unit; and
    a light source that supplies light to the optical sheet.

6. A display device comprising
    the lighting device according to claim 5; and
    a display panel that receives light from the lighting device.

7. The support unit according to claim 2, wherein the rib has a shape which becomes thinner toward a tip end of the support pin.

8. The support unit according to claim 2, wherein a tip of the support pin becomes thinner toward a tip end thereof.

9. The support unit according to claim 3, wherein a tip of the support pin becomes thinner toward a tip end thereof.

10. A lighting device comprising:
    the support unit according to claim 2;
    the optical sheet supported by the support unit; and
    a light source that supplies light to the optical sheet.

11. A display device comprising
    the lighting device according to claim 10; and
    a display panel that receives light from the lighting device.

12. A lighting device comprising:
the support unit according to claim 3;
the optical sheet supported by the support unit; and
a light source that supplies light to the optical sheet.
13. A display device comprising
the lighting device according to claim 12; and
a display panel that receives light from the lighting device.
14. A lighting device comprising:
the support unit according to claim 4;
the optical sheet supported by the support unit; and
a light source that supplies light to the optical sheet.
15. A display device comprising
the lighting device according to claim 14; and
a display panel that receives light from the lighting device.

\* \* \* \* \*